C. A. CLAFLIN.
TUBE OR PIPE JOINT.
APPLICATION FILED OCT. 19, 1912.
1,109,042.
Patented Sept. 1, 1914.
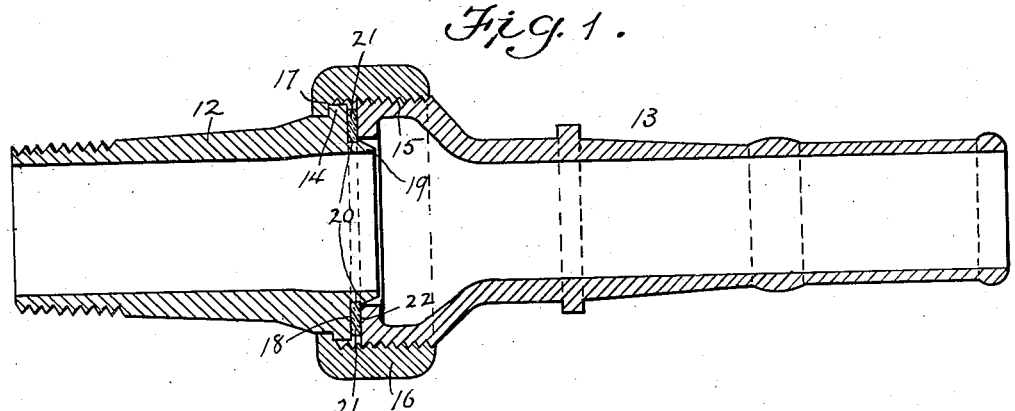
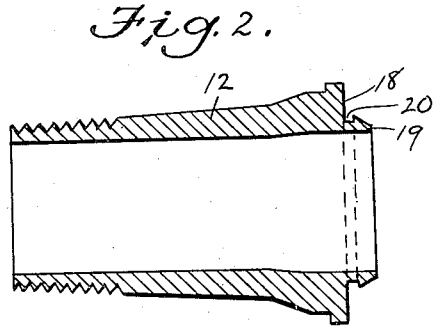
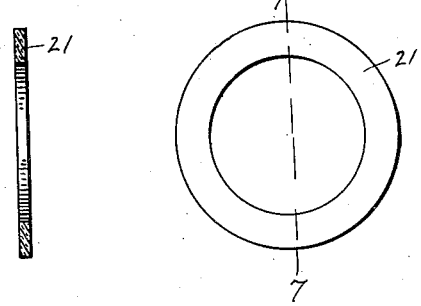
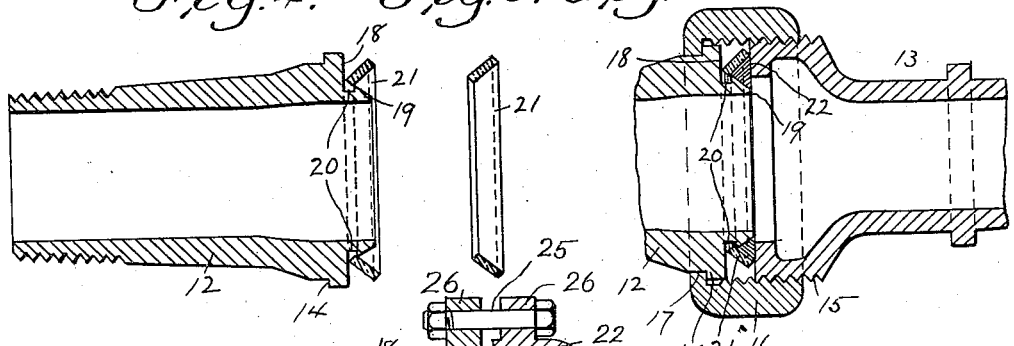
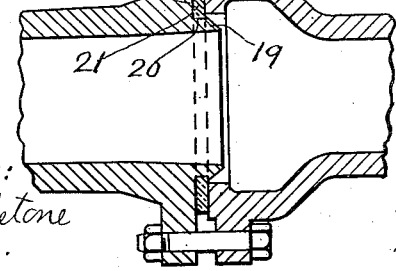
Witnesses:
Forest R. Roulstone
P. N. Pezzetti
Inventor:
C. A. Claflin
by Wright Brown Quinby May
Attys

UNITED STATES PATENT OFFICE.

CHARLES A. CLAFLIN, OF MEDFORD, MASSACHUSETTS.

TUBE OR PIPE JOINT.

1,109,042.　　　　Specification of Letters Patent.　　Patented Sept. 1, 1914.

Application filed October 19, 1912. Serial No. 726,762.

*To all whom it may concern:*

Be it known that I, CHARLES A. CLAFLIN, a citizen of the United States, and a resident of Medford, in the county of Middlesex and State of Massachusetts, have invented certain new and useful Improvements in Tube or Pipe Joints, of which the following is a specification.

This invention relates to tubular conduits composed of two members separately connected end to end, the joint at the meeting ends of the said members being packed by a gasket composed of a material such as a ductile, compressible metal or alloy, adapted to conform closely to said meeting ends and to form a fluid tight joint therewith.

The invention has for its object to provide improved means for firmly securing the gasket to one of said members, in such manner that when the members are separated, the gasket will remain in its predetermined place on one of the members, without liability to accidental displacement.

The invention consists in the improvements which I will now proceed to describe and claim.

Of the accompanying drawings, forming a part of this specification, Figure 1 represents a longitudinal section of two tubular members, operatively connected, the joint formed by their proximate ends being packed in accordance with my invention. Fig. 2 represents a longitudinal section of the gasket-carrying member, before the engagement of the gasket therewith. Fig. 3 represents a sectional view of the gasket before its engagement with the tubular member shown by Fig. 2. Fig. 4 represents a view similar to Fig. 2, showing the gasket in position for a permanent engagement with the tube member which carries it. Fig. 5 represents a view similar to Fig. 1, showing the relative positions of the parts prior to the permanent engagement of the gasket with the carrying member. Fig. 6 represents a side view of the gasket, after it has been flattened. Fig. 7 represents a section on line 7—7 of Fig. 6. Fig. 8 represents a sectional view of a modification.

The same reference characters indicate the same parts in all of the figures.

In the drawings, 12 and 13 represent two tubular members which are connected end to end to form a fluid conduit, or a portion thereof, the member 12 being here shown as externally screw-threaded at one end for engagement for another conduit portion, and provided with an external shoulder 14, while the member 13 is shown as a nipple adapted to be inserted in a flexible hose, and provided with an externally threaded portion 15 adapted to engage a coupling nut or union 16, having a flange 17 engaging the shoulder 14. The member 12 is provided with an annular end face 18, which is in a plane at right angles with the axis of the member 12. From the inner portion of said end face projects an annular lip 19, in the outer surface of which is formed an annular groove 20, the inner side of which is formed by the end face 18. The height or diameter of the outer side of the groove 20 is considerably less than that of the inner side.

21 represents an annular washer, preferably composed of a ductile metal or alloy, which is suitably inert, or non-resilient and compressible. The washer 21 is originally made of frusto-conical form, as shown by Figs. 3, 4, and 5, its inner edge being of suitable diameter to receive the lip 19, as indicated by Figs. 4 and 5. The washer is first placed upon the lip 19 with its inner edge registering with the groove 20. Pressure is then applied to one side of the washer in the direction required to flatten the washer against the face 18. This operation contracts the inner edge of the washer into the groove 20, the diameter of the said inner edge becoming less than that of the outer side of the groove. The washer is, therefore, firmly engaged with the member 12, and is free from liability to become accidentally detached therefrom when the members are separated. The pressure which flattens the washer may be caused by the operation of connecting the members 12 and 13. The member 13 has an annular end face 22, which is parallel with the end face 18 when the members are connected. After the washer has been applied to the member 12, as shown by Fig. 4, the member 13 is engaged with the coupling nut 16, as shown by Fig. 5, the nut being rotated until the member 13 is drawn into the nut, as indicated by Fig. 1, the end face 22 being thus caused to flatten the washer and contract its inner edge. It is obvious that the washer may be flattened by other means before the members 12 and 13 are connected.

Fig. 8 shows a modification, in which the tubular members are connected by bolts 25 engaged with flanges 26 on the adjacent end portions of said members.

The material of the washer is sufficiently ductile and compressible to cause the sides of the washer to conform closely to the faces 18 and 22, so that when the members are connected, the washer forms a fluid tight joint between their proximate ends. I do not limit myself to a ductile metal or metallic alloy as the material of the washer, and may use any other suitable material adapted to be formed into a frusto-conical washer, said washer being adapted to be flattened, and at the same time, contracted at its inner edge.

I claim:

1. In a tube or pipe joint a tubular member having an annular washer-supporting end face, a grooved lip projecting from said face and an annular non-resilient ductile washer bearing on said face and originally of frusto-conical form, the inner edge of the washer being contracted as described into the groove by flattening pressure of the washer against said end face, and locked in place by the outer side of the groove, the locked washer having flat sides conforming to said end faces and to an opposed face on another member.

2. A tube or pipe joint comprising two tubular members having opposed substantially parallel annular end faces, connecting means adapted to force said end faces toward each other, one of said members having an externally grooved lip, and an annular non-resilient ductile washer interposed between said faces and originally of frusto-conical form, the said end faces being formed to flatten the washer and contract its inner edge into the groove of said lip, until the washer is locked by the outer side of said groove, the locked washer having flat sides conforming to said end faces.

In testimony whereof I have affixed my signature, in presence of two witnesses.

CHARLES A. CLAFLIN.

Witnesses:
A. W. HARRISON,
P. W. PEZZETTI.